United States Patent
Graber et al.

(10) Patent No.: US 6,679,540 B1
(45) Date of Patent: Jan. 20, 2004

(54) EPOXY BONDED LAMINATE DOOR BEAM

(75) Inventors: Donald G. Graber, Garden City, MI (US); Frisco B. Borrero, Lake Orion, MI (US); James Stewart Green, Flesherton (CA)

(73) Assignee: Trim Trends Co., LLC, Farmington Hills, MI (US)

(*) Notice: Subject to any disclaimer, the term of this patent is extended or adjusted under 35 U.S.C. 154(b) by 0 days.

(21) Appl. No.: 10/383,382

(22) Filed: Mar. 7, 2003

(51) Int. Cl.[7] .................................................. B60J 5/00
(52) U.S. Cl. ................................................. 296/146.6
(58) Field of Search .......................... 296/146.6, 188, 296/146.5, 189, 146.7; 29/897.2; 293/120; 49/502, 503; 52/735.1, 731.6; 428/36.5

(56) References Cited

U.S. PATENT DOCUMENTS

| | | | | |
|---|---|---|---|---|
| 4,090,734 A | * | 5/1978 | Inami et al. ............. | 296/146.6 |
| 4,397,914 A | | 8/1983 | Miura et al. | |
| 4,424,254 A | | 1/1984 | Hedrick et al. | |
| 4,594,292 A | | 6/1986 | Nagai et al. | |
| 4,796,946 A | * | 1/1989 | Wilson et al. ........... | 296/146.6 |
| 4,922,596 A | * | 5/1990 | Wycech ................... | 29/897.2 |
| 4,969,680 A | * | 11/1990 | Shimoda .................. | 296/146.6 |
| 5,093,990 A | * | 3/1992 | Klippel .................... | 296/146.6 |
| 5,149,167 A | | 9/1992 | Rieck et al. | |
| 5,255,487 A | * | 10/1993 | Wieting et al. ........... | 296/146.6 |
| 5,314,228 A | * | 5/1994 | Figge, Sr. ................ | 296/146.6 |
| 5,536,060 A | | 7/1996 | Rashid et al. | |
| 5,544,930 A | * | 8/1996 | Stedman .................. | 296/146.6 |
| 5,560,672 A | * | 10/1996 | Lim et al. ............... | 296/187.05 |
| 5,573,298 A | * | 11/1996 | Walker et al. ........... | 296/146.6 |
| 5,575,526 A | | 11/1996 | Wycech | |
| 5,580,120 A | | 12/1996 | Nees et al. | |
| 5,600,931 A | * | 2/1997 | Jonsson ................... | 296/146.6 |
| 5,605,371 A | | 2/1997 | Borchelt et al. | |
| 5,672,405 A | * | 9/1997 | Plank et al. ................. | 293/120 |
| 5,755,484 A | * | 5/1998 | Chou et al. .............. | 296/146.6 |
| 5,785,376 A | * | 7/1998 | Nees et al. ............... | 296/146.6 |
| 5,865,496 A | * | 2/1999 | Odan et al. .............. | 296/146.6 |
| 5,884,960 A | | 3/1999 | Wycech | |
| 5,887,938 A | * | 3/1999 | Topker et al. ........... | 296/146.6 |
| 5,962,797 A | * | 10/1999 | Spercel et al. ............ | 84/297 R |
| 6,003,274 A | | 12/1999 | Wycech | |
| 6,196,619 B1 | | 3/2001 | Townsend et al. | |
| 6,220,652 B1 | * | 4/2001 | Browne et al. .......... | 296/146.6 |
| 6,227,609 B1 | * | 5/2001 | Mellis ..................... | 296/146.6 |
| 6,290,282 B1 | * | 9/2001 | Hortlund et al. ......... | 296/146.6 |
| 6,382,707 B1 | * | 5/2002 | Dunneback .............. | 296/146.6 |
| 6,390,534 B1 | * | 5/2002 | Lee et al. ................. | 296/146.6 |
| 6,398,289 B1 | * | 6/2002 | Gehringhoff ............. | 296/146.6 |
| 6,416,114 B1 | * | 7/2002 | Topker et al. ........... | 296/146.6 |
| 6,509,541 B2 | * | 1/2003 | Jung et al. ................. | 219/91.2 |
| 6,550,847 B2 | * | 4/2003 | Honda et al. ............ | 296/146.6 |
| 2002/0069609 A1 | * | 6/2002 | Nees et al. ............... | 296/146.6 |
| 2002/0113459 A1 | * | 8/2002 | Laborie et al. .......... | 296/146.6 |
| 2002/0195833 A1 | * | 12/2002 | Fukutomi ................ | 296/146.6 |
| 2003/0042754 A1 | * | 3/2003 | Seo .......................... | 296/146.6 |

FOREIGN PATENT DOCUMENTS

CA 988124 4/1976

* cited by examiner

*Primary Examiner*—Kiran Patel
(74) *Attorney, Agent, or Firm*—Dykema Gossett PLLC

(57) ABSTRACT

A door intrusion beam is of laminated construction and has a base metal stamping with end flanges, with the base metal stamping being of an inverted generally U-shaped cross section. Slidable and nested on the base metal stamping are a plurality of slidable and stackable elongated plastic elements each having a generally M-shaped configuration. The first plastic element next to the metal stamping and all stackable elongated plastic elements are secured together by layers of adhesives where surfaces contact one another. The plastic elements are of varying length.

15 Claims, 3 Drawing Sheets

EPOXY BONDED LAMINATE DOOR BEAM

BACKGROUND OF THE INVENTION

1. Field of the Invention

This invention relates to an epoxy bonded laminate door beam or impact beam assembly for a vehicle door and, in particular, to a stackable door beam having a base metal stamping and which is provided with one or more slidable and stackable elongated plastic elements thereon to vary the strength of the beam from car line to car line. The metal stamping is of an inverted U-shaped cross section and the plastic elements are each of generally M-shaped configuration and are manufactured using conventional forming techniques.

2. Description of the Prior Art

Impact protection is of prime importance to the automotive industry. Independent beams have been employed in a manner to prevent deep penetration of an impacting vehicle into the passenger space of an impacted vehicle. Such independent beams have taken various forms. One form is that of a convoluted strip of sheet steel spanning a generally mid-section of the door as well as bisecting the interior door space, with the beam being rigidly attached such as by welding to the opposite portions of the door frame. Since impact forces may be quite high, the beams have been generally made of moderate gauge high-strength steel.

Other beams include structural steel members which extend between the fore and aft vertically extending walls of the vehicle door. In the past, these structural members have been stamped from sheet metal into various cross-sectional configurations, most commonly a hat-shaped cross section. Straight tubular beams with various end attachments are also used for these structural steel members.

However, certain drawbacks surround the use of such known beams including the obstruction of space within the interior of the door to thereby hinder the location of a variety of mechanism and wiring to be installed within the door. In addition, the weight of the impact beams have adversely increased the overall weight of the vehicle.

Furthermore, Federal Vehicle Safety Standards specify that side door impact beams must meet certain load or energy absorbing criteria for a specified lateral displacement of the door in response to a vehicle being subjected to a side impact. While known side door impact beam assemblies used in vehicles produced in the United States of America have been satisfactory in use, and have meet the Federal Vehicle Safety Standards, there is a continuing effort to reduce the mass and/or cost of these assemblies and the tooling used in making same without sacrificing protection or energy-absorption of these side impact beam assemblies.

Accordingly, automobile manufacturers are desirous of providing enhanced impact resistance by an impact beam which offers greater strength and flexibility and economical advantages.

SUMMARY OF THE PRESENT INVENTION

The present invention relates to a stackable door beam or impact beam which consists of a base stamping made out of metal and having one or more stackable plastic elements superimposed on one another and onto the base metal stamping, with an adhesive layer such as epoxy resin interposed between adjacent pieces.

The vehicle door intrusion beam of the present invention includes a longitudinal door beam metal stamping having first and second ends and a length therebetween, with the metal stamping having a generally inverted U-shaped cross section having a base with a pair of legs, with the base at the center thereof having a longitudinally extending recess throughout the length of the metal stamping and with the legs being directed downwardly and outwardly away from the recess and having the ends of the legs curved throughout the length of the door beam metal stamping. One or more slidable and stackable elongated plastic elements are superimposed one on top of the other and on the longitudinal door beam metal stamping, with each of the slidable and stackable elongated plastic elements having a generally M-shaped cross section which is symmetrical about the center thereof and including a base and a pair of legs, with the center portion of the base of each plastic element being depressed to form a longitudinally extending channel. The channel of the first plastic element closest to the door beam metal stamping is received and nested in the longitudinally extending recess provided in the door beam metal stamping, with the channel of each of the plastic elements after the first mentioned plastic element being received in the preceding channel of the adjacent plastic element. The pair of legs of each plastic element extend downwardly and away from its respective channel, with portions of the legs of the plastic channel engaging the outer surfaces of the legs provided on the door beam metal stamping or on the legs of the preceding plastic element.

With such a construction, the longitudinal door beam metal stamping has a length equal to or greater than the length of the slidable and stackable elongated plastic element. Layers of structural adhesives such as an epoxy resin are interposed between the metal stamping and the first mentioned plastic element and between the surfaces of abutting adjacent plastic elements throughout the length thereof which bonds and secures the plastic elements and the metal stamping together as an integrated door intrusion beam which can be mounted in the interior well of the vehicle door.

Another feature of the present invention is to provide a door intrusion beam of the aforementioned type wherein each of the plastic elements are slidable and adjusted lengthwise on the metal stamping to provide the required yield strength of the door intrusion beam.

Still another feature of the present invention is to provide a door intrusion beam of the aforementioned type wherein one of the layers of a structural adhesive is provided between the channel of the first plastic element and the longitudinally extending recess of the metal stamping and between the surfaces of the legs of the first plastic element and the legs of the metal stamping.

A further feature of the present invention is to provide a door intrusion beam of the aforementioned type wherein metal end brackets are provided on the first and second ends of the metal stamping for mounting the intrusion beam in the interior weld of the door of the vehicle.

A still further feature of the present invention is to provide a door intrusion beam of the aforementioned type wherein the end brackets have means for securing the intrusion beams to the door.

Another feature of the present invention is to provide a door intrusion beam of the aforementioned type wherein the end brackets are integrally formed with the metal stamping from a single piece of metal material.

Still another feature of the present invention is to provide a door intrusion beam of the aforementioned type wherein the plurality of slidable and stackable plastic elements include two or more elements which are slidably positioned and located relative to the metal stamping depending on the required yield strength of the door intrusion beam.

A further feature of the present invention is to provide a door intrusion beam of the aforementioned type wherein there are three slidable and stackable plastic elements of varying lengths positioned and located on the metal stamping depending on the yield strength of the door intrusion beam.

A still further feature of the present invention is to provide a door intrusion beam of the aforementioned type wherein the first plastic element has a length equal to or less than the length of the metal stamping, while the second plastic element has a length equal to three-fourths the length of the metal stamping and while the third plastic element has a length equal to one-half the length of the metal stamping.

Another feature of the present invention is to provide a door intrusion beam of the aforementioned type wherein the second and third plastic elements may be placed at either n end of the metal stamping or at any position between the ends thereof.

Still another feature of the present invention is to provide a door intrusion beam of the aforementioned type wherein the structural adhesive is an epoxy bond material which may be either a heat bonded glue or a heat sensitive glue.

A still another feature of the present invention is to provide a door intrusion beam of the aforementioned type wherein the metal material is initially rolled, then flattened on the ends and finally stamped to the requisite configuration and the plastic elements are rolled by moving plastic strip material through rolled forming equipment and thereafter cutting the formed plastic elements to length.

Other features and objects of the invention will be apparent from the following detailed description taken in conjunction with the accompanying drawings.

BRIEF DESCRIPTION OF THE DRAWINGS

The present invention will be more fully understood by reference to the following detailed description of a preferred embodiment of the present invention when read in conjunction with the accompanying drawings, in which like reference characters refer to like parts throughout the views.

FIG. 3 is a perspective view of the door intrusion beam;

DETAILED DESCRIPTION OF THE PREFERRED EMBODIMENT OF THE PRESENT INVENTION

Figure 1:
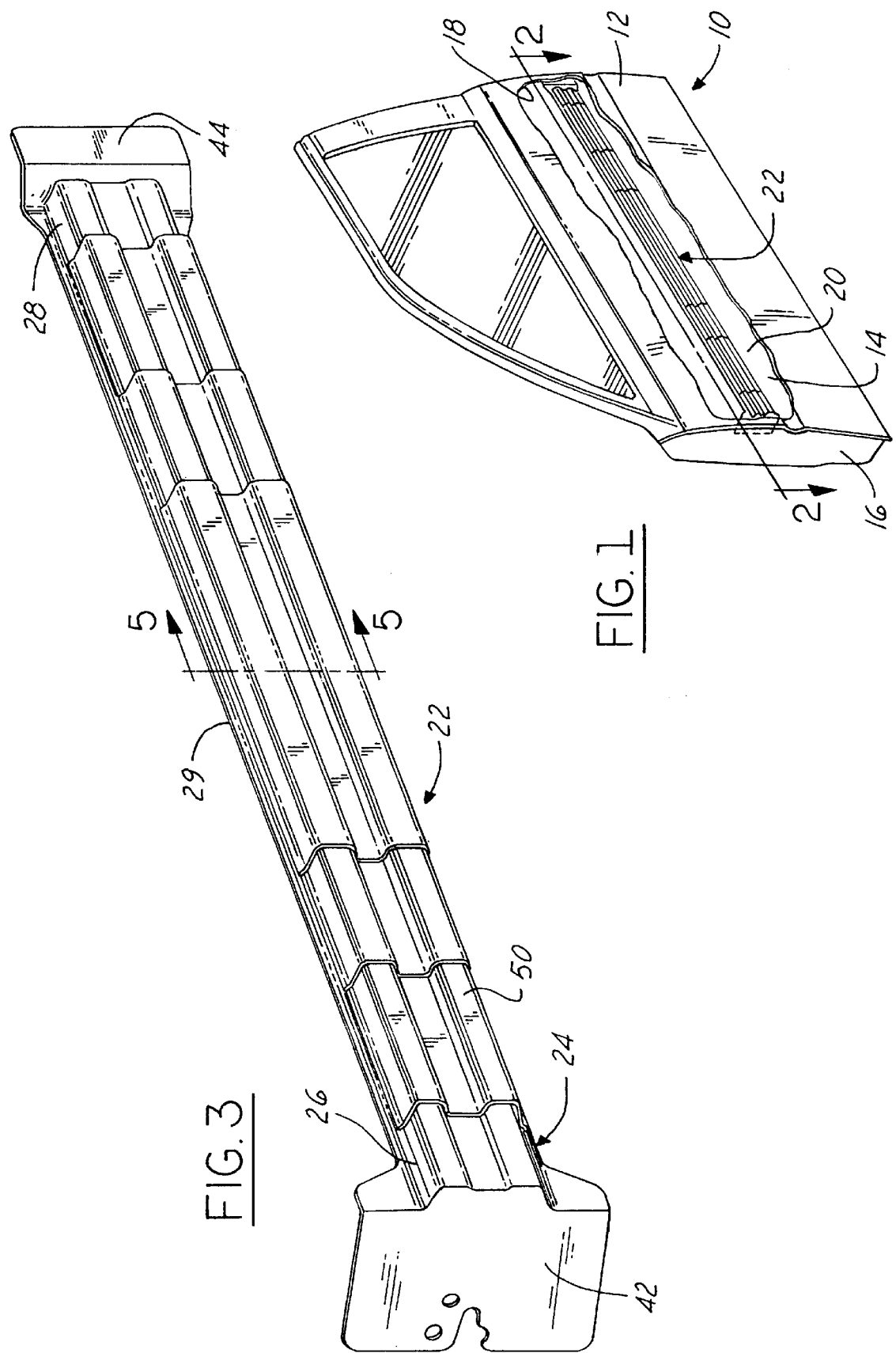
FIG. 1 is a perspective view of a vehicle door with parts broken away and illustrating the door intrusion beam of the present invention.
Figure 2:
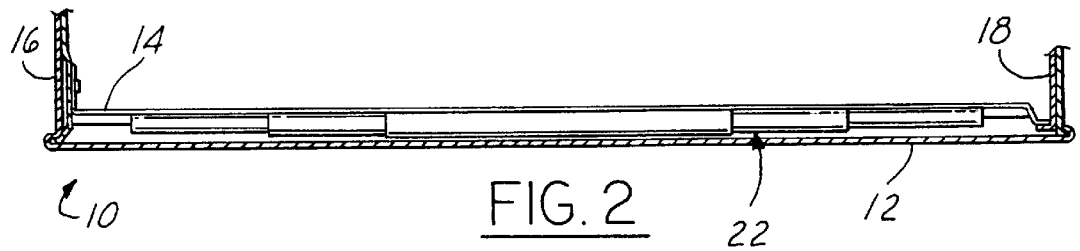
FIG. 2 is a horizontal view through the door and looking in the direction of arrows 2—2 of FIG. 1.

Referring now to the drawings, there is shown in FIG. 1 a vehicle door 10 which is adapted to be hingedly mounted to a vehicle body. The vehicle door 10 includes an outer sheet metal panel 12, an inner sheet metal panel 14, and front and rear metal end walls 16 and 18 to which the outer and inner panels 12 and 14 are welded as is conventional in the art. A door well 20 located in the door 10 and is formed by the outer panel 12, the inner panel 14 and the end walls 16 and 18.

In order to structurally reinforce the door 10 against side door impacts, a door intrusion beam or side impact door intrusion beam 22 of the present invention is designed and located within the door 10 to absorb the energy of an impact against the vehicle door 10. In accordance with the present invention, the door beam assembly 22 provides a reduction of weight in the door assembly 10 and a reduction of manufacturing costs in the tooling and through the use of less expensive materials, while maintaining the Federal Vehicle Safety Standards mentioned previously.

Figure 5:
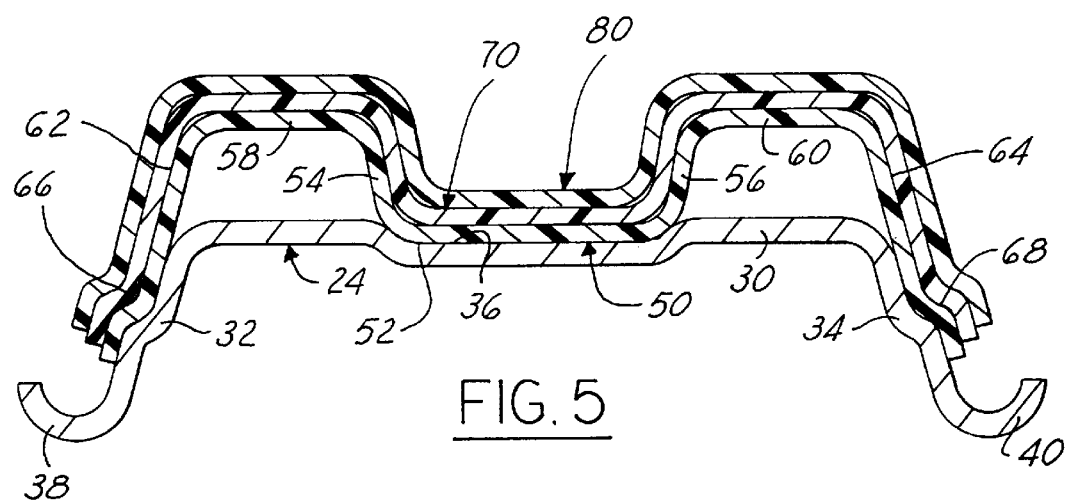
FIG. 5 is a sectional view through the door intrusion beam taken on the line 5—5 of FIG. 3.

Referring now to FIGS. 1–4 inclusive, the vehicle door intrusion beam 22 of the present invention includes an elongated or longitudinal door beam member or metal stamping 24 having a first end 26, a second end 28 and a length 29 therebetween as best illustrated in the drawings. The metal stamping 24 has a generally inverted U-shaped cross section as illustrated in FIG. 5 having a base 30 with a pair of legs 32 and 34. The base 30 at the center thereof has a longitudinally extending recess 36 throughout the length of the metal stamping 24. The legs 32 and 34 are directed downwardly from the base 30 and outwardly away from the recess 36. The ends of the legs 32 and 34 are curved at 38 and 40 respectively. The curved ends 38 and 40 of the legs extend the length of the door beam metal stamping 24.

Referring once again to FIG. 3, the metal stamping 24 is provided with a pair of end brackets 42 and 44. The brackets 42 and 44 are integrally formed with the ends 26 and 28 of the beam metal stamping 24. The end brackets 42 and 44 facilitate attachment of the door intrusion beam 22 to the vehicle door 10. Specifically, the end brackets 42 and 44 are bolted or welded to the end walls 16 and 18 of the door 10 as illustrated in FIG. 1 such that the door intrusion beam 22 extends horizontally across the door well 20 of FIG. 1. The brackets 42 and 44 assist the composite door beam 24 in absorbing impacts as will subsequently be described.

Figure 6:
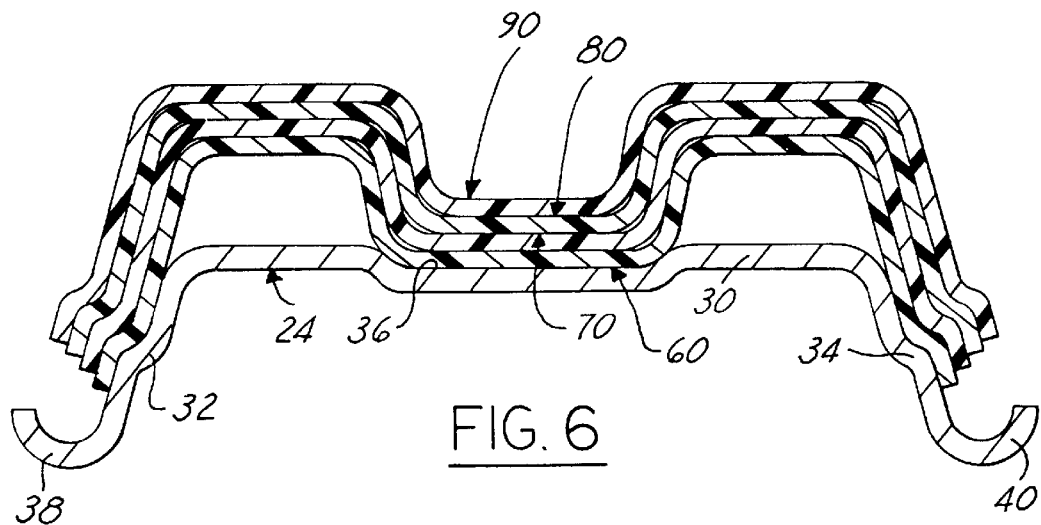
FIG. 6 is a first alternate cross sectional configuration of the door intrusion beam, illustrating four slidable and stackable plastic elements superimposed on the door beam metal stamping.

The base stamping 24 is made, as an example, from 50 ksi metal material which is initially rolled through a roll mill, then flattened on the ends and finally stamped to the requisite inverted U-shaped configuration as best illustrated in FIGS. 5 and 6. The base metal stamping 24 may be used with door intrusion beams for different automobiles which may require one, two, three or any number of stackable elongated elements or pieces thereon each having a strength, as an example, of 80 ksi when made from plastic material. This allows the strength of a door impact beam to vary from car line to car line, whatever the customer is requiring. The present invention permits the customer or manufacturer to purchase or buy only the base metal stamping 24. At the present time, a customer must buy the whole product and the whole tooling for the product which is usually at an exorbitant cost. Tooling costs can be between $300,000 to $500,000. With the present invention, the manufacturer purchases the tooling for the base stamping which will be no more than $100,000, as an example, for the stamping itself. The base stamping will be unique to the vehicle for which it is intended and upon that, the manufacturer advises the supplier of the strength and the yield strength required for the door impact beam. Based upon this information, one or any number of stackable plastic elements or pieces will be superimposed over the metal stamping. Thus, depending on the yield strength required, the door impact beam may have stack ed and located on the base stamping one, two, three or any number of pieces or elements. As an example, if the manufacturer requires 100 psi yield strength, the supplier takes the base metal stamping of 50 ksi and supplies the 80 ksi plastic pieces or elements to achieve the required yield strength. If the customer required only an 80 psi yield strength, only one of the plastic elements would be added to the base metal stamping.

The stackable plastic elements that will be added to the base metal stampings are common pieces that will be available right off the shelf such as in a grocery store, as an example. The stackable pieces or elements will be varied in length. As an example, the initial plastic element, that is, the first one that goes on the basic metal stamping, is generally t he full length of the stamping or slightly less. The second plastic element or piece is generally ¾ the length of the base metal stamping while the third plastic element is generally half the length of the part which allows the supplier to place the yield strength in the area the customer has requested. The system of the present invention allows a supplier to take the plastic element and slide it along the base metal stamping to either the front of the beam or to the rear of the beam. The resulting beam design is like that of a trust.

Figure 4:
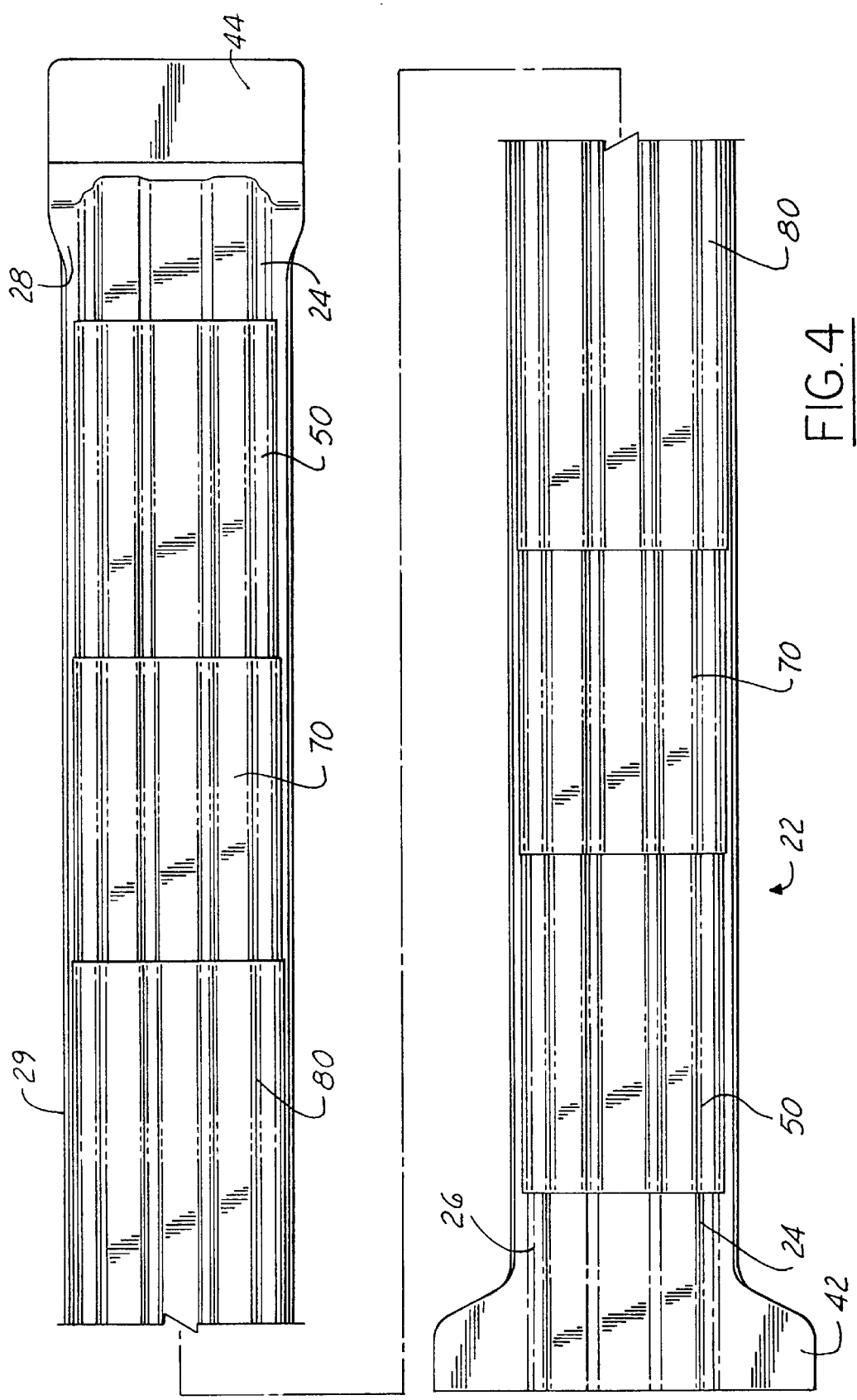
FIG. 4 is a front elevational view of the door intrusion beam, broken away at the center.

Referring now to the drawings, the first plastic element 50 is of M-shaped cross section and include s a bas e portion 52 which is received in the recess 36 of the base metal stamping 24. The first plastic element or piece 50 has extending from the base 52, a pair of upwardly extending walls 54, 56, each having a flange 58, 60 terminating in downwardly extending legs 62 and 64. The walls 54, 56 and base portion 52 define or form a channel which extend the entire length thereof. Terminal ends 66 and 68 of the legs 62 and 64 are curved and bent so as to provide a mating surface for the legs 32 and 34 of the base metal stamping 24. The plastic element 50 just described has a length equal to or slightly less than the overall length of the base metal stamping 24 as illustrated in FIGS. 3 and 4. The channel of the first plastic element or piece 50 is received in recess 36. The element 50 is slidably positioned on and connected to the base metal stamping 24 by an adhesive such as an epoxy bond which secures plastic to metal as will be subsequently described.

The second plastic element 70 is of similar configuration and cross section to the first plastic element 50. It is of the same configuration as element 50 and has corresponding base, walls, channels, flanges and legs. The plastic element 70 is slidably on and nested in the first plastic element 50 and has a length approximately ¾ the length of the first plastic element 50. The surfaces of the mating base, walls, flanges and legs are connected by an adhesive layer throughout the entire length of the second element.

A third plastic element or piece 80 is illustrated in FIG. 5 and is of similar cross section as are corresponding elements 70 and 50. A third plastic element has a length equal to half the length of the base metal stamping. The plastic element 80 is nested in and is slidable on the second plastic element 70. A plastic layer of adhesive is provided between the contacting surfaces of the second and third plastic elements 70 and 80.

The base metal stamping 24 has a thickness of 2.0 mm (50 ksi) and the plastic elements each have a thickness of 1.5 mm (80 ksi).

FIG. 6 illustrates a modification of the door beam of FIG. 5 and includes an additional plastic element 90 which is received in and slidable on the plastic element 80. Plastic element 90 has a configuration similar to the other plastic elements 60, 70 and 80. The length of the plastic element 90 is less than half the length of the stamping and is positioned on the composite beam at either end or even in the center of the impact door beam depending on where the yield strength of the beam is required.

It is recommended that the adhesive such as an epoxy be provided between the contacting surfaces throughout the length thereof.

Various types of adhesives may be utilized such as TEROKAL-4520-34 available from Henkel Teroson GmbH. Such an adhesive is a paste-like, heat curing one component adhesive, based on epoxy resins. Other resins available from Dow Chemical may also be utilized such as heat bonded glue or heat sensitive glue.

With the present invention, the customer will save substantial dollars in the cost of tooling since only tooling will be required for the base metal stamping. Thereafter, the additional strength of the door beam will be selected as required off the shelf. The selected number of plastic elements of varying lengths are selected and are slidable on and adhesively secured together. There will be no capital investment required for the plastic elements.

The base metal stamping is rolled and then flattened on the ends and then stamped. The plastic elements are rolled and are placed on the shelf and can be used with varying metal base stampings of different door intrusion beams.

The present invention provides a lighter and less expensive door intrusion beam while still exhibiting improved energy absorption properties. The unique cross sectional configuration of the door beam assembly permits the plastic elements to be slidable and located on the base metal stamping where required to provide the designated yield strength for the beam.

In certain applications, the longitudinal door beam member 24 may be made from either a plastic or metal material in the form of a plastic rolled member or a metal stamping. In addition, the slidable and stackable elongated elements may be made from metal, as example, metal stampings of varying length or rolled from a plastic material.

The foregoing detailed description has been given for clearness of understanding only and no unnecessary limitations should be understood therefrom, as modifications will be obvious to those skilled in the art.

What is claimed is:

1. A door intrusion beam for use within a vehicle door, the vehicle door having an interior well and forward and rearward walls to which said beam is secured, said door intrusion beam comprising:

a longitudinal door beam metal stamping having first and second ends and a length therebetween;

said metal stamping having an inverted generally U-shaped cross section having a base with a pair of legs, said base at the center thereof having a longitudinally extending recess throughout the length of the metal stamping and said legs being directed downwardly and outwardly away from said recess and having the ends of the legs curved throughout the length of the door beam metal stamping;

a plurality of slidable and stackable elongated plastic elements superimposed one on top of the other and on said longitudinal door beam metal stamping;

each of said slidable and stackable elongated plastic elements having a generally M-shaped cross section which is symmetrical about the center thereof and including a base and a pair of legs, the center portion of the base of each plastic element being depressed to form a longitudinally extending channel;

the channel of the first plastic element closest to said door beam metal stamping being received and nested in the longitudinally extending recess provided in said door beam metal stamping;

the channel of each of the plastic elements after the first mentioned plastic element being received in the preceding channel of the adjacent plastic element;

the pair of legs of each plastic element extending downwardly and away from its respective channel, with portions of the legs of the plastic channel engaging the outer surfaces of the legs provided on said door beam metal stamping or on the legs of the preceding plastic element;

said longitudinal door beam metal stamping having a length equal to or greater than said slidable and stackable elongated plastic elements; and layers of a structural adhesive interposed between said metal stamping and the first mentioned plastic elements and between the surfaces of abutting adjacent plastic elements throughout the length thereof which bonds and secures said plastic elements and metal stamping together as an integrated door intrusion beam.

2. The door intrusion beam defined in claim 1 wherein each of said plastic elements are slidable and adjusted lengthwise of said metal stamping to provide the required yield strength of said door intrusion beam.

3. The door intrusion beam defined in claim 1 wherein one of said layers of structural adhesive is provided between the channel of said first plastic element and said longitudinally extending recess of said metal stamping and between the engaged legs of the first plastic element and the legs of said metal stamping.

4. The door intrusion beam defined in claim 1 wherein metal end brackets are provided on the first and second ends of said metal stamping for mounting the intrusion beam in the interior well of the door.

5. The door intrusion beam defined in claim 4 wherein said end brackets have means for securing said intrusion beam to the walls of the door.

6. The door intrusion beam defined in claim 4 wherein said end brackets are integrally formed with said metal stamping from a single piece of metal material.

7. The door intrusion beam defined in claim 1 wherein said plurality of slidable and stackable plastic elements include two or more elements which are slidably positioned relative to said metal stamping depending on the required yield strength of the door intrusion beam.

8. The door intrusion beam defined in claim 1 wherein there are three slidable and stackable plastic elements of varying lengths positioned on said metal stamping depending on the yield strength of the door intrusion beam.

9. The door intrusion beam defined in claim 1 wherein said first plastic element has a length equal to the length of said metal stamping.

10. The door intrusion beam defined in claim 9 wherein said second plastic element has a length equal to three-fourths the length of said metal stamping.

11. The door intrusion beam defined in claim 10 wherein said third plastic element has a length equal to one-half the length of said metal stamping.

12. The door intrusion beam defined in claim 1 wherein said third plastic element may be placed at either end of the second plastic element or at any position in-between.

13. The door intrusion beam defined in claim 1 wherein said structural adhesive is an epoxy bond material which may be either a heat bonded glue or a heat sensitive glue.

14. The door intrusion beam defined in claim 1 wherein the metal material is initially rolled, then flattened on the ends and finally stamped to the requisite configuration.

15. The door intrusion beam defined in claim 1 wherein said plastic elements are rolled by moving plastic strip material through rolled forming equipment and cutting the formed plastic elements to length.

* * * * *